(12) United States Patent
Filbry

(10) Patent No.: US 7,743,658 B2
(45) Date of Patent: Jun. 29, 2010

(54) METHOD AND DEVICE FOR IDENTIFYING A DAMAGED BEARING OF A ROTATING SHAFT

(75) Inventor: Karl-Heinz Filbry, Höchheim (DE)

(73) Assignee: Siemens Aktiengesellschaft, Munich (DE)

( * ) Notice: Subject to any disclaimer, the term of this patent is extended or adjusted under 35 U.S.C. 154(b) by 385 days.

(21) Appl. No.: 11/577,544

(22) PCT Filed: Oct. 18, 2005

(86) PCT No.: PCT/EP2005/055326

§ 371 (c)(1),
(2), (4) Date: Apr. 19, 2007

(87) PCT Pub. No.: WO2006/042844

PCT Pub. Date: Apr. 27, 2006

(65) Prior Publication Data

US 2008/0083280 A1 Apr. 10, 2008

(30) Foreign Application Priority Data

Oct. 19, 2004 (DE) .................. 10 2004 050 897

(51) Int. Cl.
*G01H 1/00* (2006.01)

(52) U.S. Cl. .................. 73/579; 73/593; 73/602
(58) Field of Classification Search .................. 73/579, 73/660, 602, 593
See application file for complete search history.

(56) References Cited

U.S. PATENT DOCUMENTS 5,511,422 A 4/1996 Hernandez (Continued)

FOREIGN PATENT DOCUMENTS

DE 252 102 A3 12/1987

(Continued)

OTHER PUBLICATIONS

Geropp B: "Hüllkurvenanalyse—Verfahren zur Schadensfrüherkennung"; Jan. 1999, Antriebstechnik, Vereinigte Fachverlage, Mainz, DE, pp. 51-55; XP000800697; ISSN: 0722-8546; Seite 52, rechte Spalte, Absatz 4; Seite 53, linke Spalte, Absatz 4.2.

*Primary Examiner*—Hezron Williams
*Assistant Examiner*—Nashmiya S Fayyaz
(74) *Attorney, Agent, or Firm*—Henry M. Feiereisen; Ursula B. Day

(57) ABSTRACT

The invention relates to a method and a device for identifying a damaged bearing (4a, 4b) of a rotating shaft (1). According to the invention: the rotational speed (n) of the shaft (1) is determined; the alternating component ($n_{AC}$) of the rotational speed (n) is determined, together with a smooth curve (h) of said alternating component ($n_{AC}$) of the rotational speed (n); the smooth curve (h) is converted into the frequency range and a frequency response (B) of the value of the smooth curve (h) is determined. Said frequency response (B) of the value of the curve is monitored for the passing of a threshold value ($G_1$, $G_2$, $G_3$, $G_4$) and if said threshold value ($G_1$, $G_2$, $G_3$, $G_4$) is exceeded, a damaged bearing (4a, 4b) is identified. The invention thus provides a method and a device for identifying a damaged bearing (4a, 4b) of a rotating shaft (1) of a motor, which do not require a vibration sensor (11) to identify a damaged bearing (4a, 4b) of said shaft (1).

7 Claims, 2 Drawing Sheets

U.S. PATENT DOCUMENTS

| | | | |
|---|---|---|---|
| 6,289,735 B1 * | 9/2001 | Dister et al. | 73/579 |
| 2004/0036621 A1 * | 2/2004 | Morita et al. | 340/682 |
| 2005/0177321 A1 * | 8/2005 | Wang et al. | 702/35 |

FOREIGN PATENT DOCUMENTS

| | | |
|---|---|---|
| DE | 197 02 234 A | 8/1993 |
| DE | 199 38 721 A1 | 2/2001 |
| DE | 102 28 389 A1 | 10/2003 |
| JP | 2002295464 A | 10/2002 |
| JP | 2003161292 A | 6/2003 |

* cited by examiner

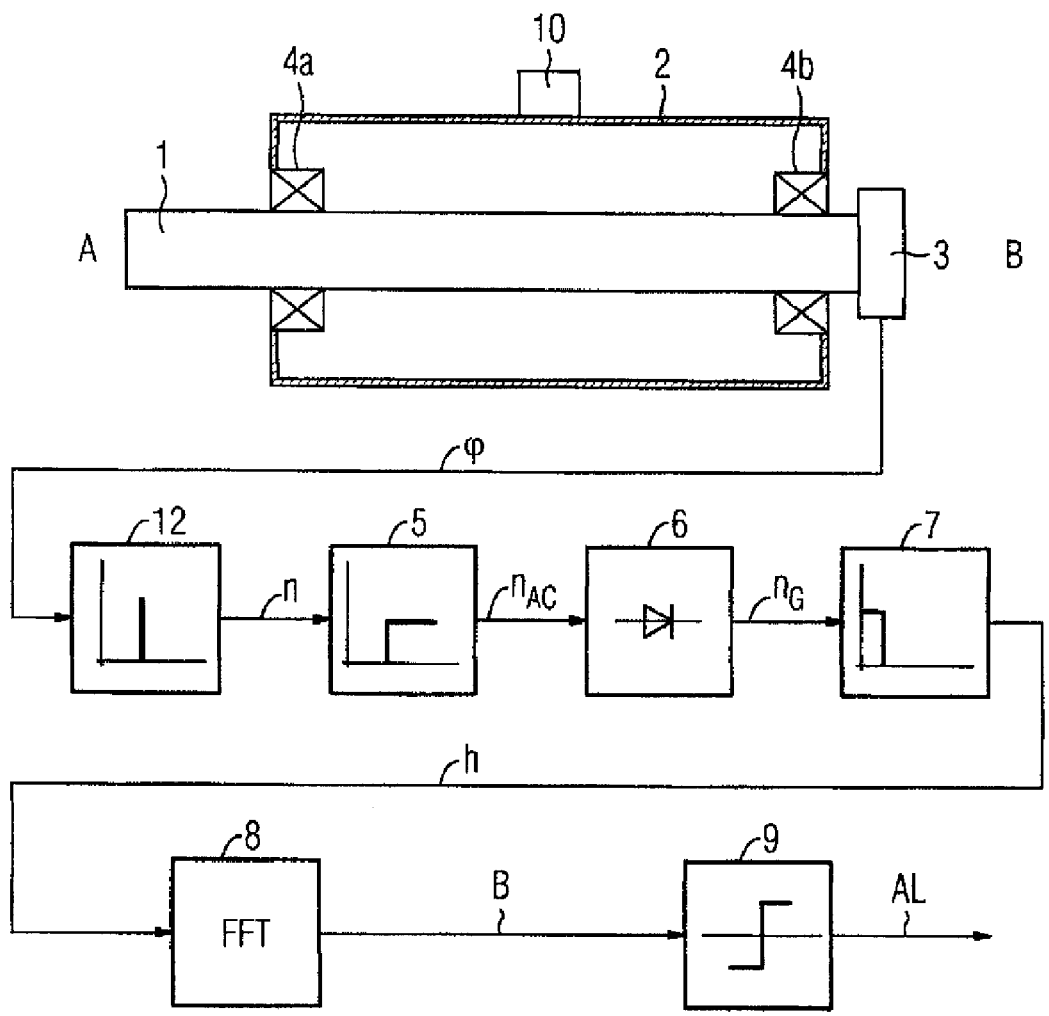

METHOD AND DEVICE FOR IDENTIFYING A DAMAGED BEARING OF A ROTATING SHAFT

BACKGROUND OF THE INVENTION

The invention relates to a method and to a device for identifying a damaged bearing of a rotating shaft.

In motors, in particular in electric motors, the bearings of a rotating motor shaft of the motor must frequently be monitored for bearing damage.

FIG. 1 illustrates a standard method and a standard device for identifying a damaged bearing of a rotating motor shaft of a motor. The motor as per FIG. 1 has two sides A and B, which are denoted in FIG. 1 by A and B. The motor comprises a motor shaft 1, which is mounted by means of two bearings 4a and 4b, and a housing 2. Rolling bearings, for example, can serve as bearings 4a and 4b. In order to measure the position, that is to say the angular position of the motor shaft in relation to an origin, and/or in order to measure the rotational speed of the motor shaft, the motor has a position sensor 3 which, in the example, is in the form of a resolver. The position sensor 3 outputs the position φ of the motor shaft, for the open-loop and/or closed-loop control of the motor, to an open-loop and/or closed-loop control unit of the motor. The motor does of course comprise further elements, but these are not illustrated in FIG. 1 as they are not essential to the understanding of the invention.

In the standard method for identifying a damaged bearing of a rotating motor shaft of a motor, a vibration sensor 11 is attached to the motor, which vibration sensor 11 measures the vibrations of the motor. The vibration sensor 11 passes a vibration signal S on to an external evaluating unit 13 which is not a constituent part of the open-loop and/or closed-loop control device. In the evaluating unit 13, an envelope is placed over the vibration signal S, the envelope undergoes a Fourier transformation and the absolute frequency response of the envelope is determined. If the absolute frequency response exceeds a limit value, bearing damage is identified and an alarm signal AL is generated. Here, the alarm signal AL is preferably generated after a relatively long period of exceedance of the limit value in order to avoid false alarms.

The standard method and the standard device for identifying a damaged bearing have some disadvantages. On the one hand, a vibration sensor must be provided, and on the other hand, the external evaluating unit 13 is usually required as a separate unit which is not a constituent part of an already-existing open-loop and/or closed-loop control device for the open-loop and/or closed-loop control of the motor. Said disadvantages make the above-described standard method and standard device for identifying a damaged bearing expensive and complex.

SUMMARY OF THE INVENTION

The invention is based on the object of specifying a device and a method for identifying a damaged bearing of a rotating shaft, in which no vibration sensor is required for identifying a damaged bearing of the shaft.

Said object is achieved by means of a method for identifying a damaged bearing of a rotating shaft,
- with a rotational speed of the shaft being determined,
- with the alternating component of the rotational speed being determined,
- with an envelope of the alternating component of the rotational speed being determined,
- with the envelope being transformed into the frequency domain and an absolute frequency response of the envelope being determined,
- with the absolute frequency response being monitored for the exceedance of a limit value, and a damaged bearing being identified in the event of an exceedance of the limit value.

Said object is also achieved by means of a device for identifying a damaged bearing of a rotating motor shaft of a motor, with the device having
- means for determining a rotational speed of the shaft,
- means for determining the alternating component of the rotational speed,
- means for determining an envelope of the alternating component of the rotational speed,
- means for transforming the envelope into the frequency domain and determining an absolute frequency response of the envelope,
- means for monitoring the absolute frequency response for the exceedance of a limit value, with a damaged bearing being identified in the event of an exceedance of the limit value.

A first advantageous embodiment of the invention is characterized in that the shaft is embodied as a motor shaft of a motor. Bearing damage often occurs with motor shafts in particular.

It has also proven to be advantageous if the limit value is monitored for exceedance in the range of a bearing pass frequency, since the absolute frequency response of the envelope rises particularly sharply in the range of a bearing pass frequency in the event of a damaged bearing.

It has also proven to be advantageous if a bearing pass frequency of the bearing is stored in a memory on a motor. This considerably simplifies the starting-up of the motor, since the motor can directly provide the bearing pass frequency to, for example, an open-loop and/or closed-loop control device for the open-loop and/or closed-loop control of the motor.

It has additionally proven to be advantageous if the rotational speed of the shaft is determined by virtue of a position, measured by a position sensor, of the shaft being differentiated with respect to time. In this way, the rotational speed of the shaft is determined from the position of the shaft in the standard way.

It has additionally proven to be advantageous if the envelope of the alternating component of the rotational speed is determined by virtue of the alternating component being rectified and the rectified alternating component being low-pass filtered. This allows the envelope to be determined in a particularly simple manner.

It is particularly advantageous if the device according to the invention is embodied as an open-loop and/or closed-loop control device for the open-loop and/or closed-loop control of a motor, since an open-loop and/or closed-loop control device is provided anyway for the open-loop and/or closed-loop control of the motor. An additional external evaluating unit for identifying bearing damage as per the prior art can thereby be dispensed with.

It is also advantageous to provide a computer program product, for example in the form of a diskette, a hard drive, a Compact Disk, a flash card or in the form of some other storage medium, for the device according to the invention, which computer program product contains code sections with which a method according to the invention can be carried out.

Advantageous embodiments of the device according to the invention are yielded analogously to advantageous embodiments of the method according to the invention, and vice versa.

BRIEF DESCRIPTION OF THE DRAWING

One exemplary embodiment of the invention is illustrated in the drawing and is explained in more detail below. In the drawing:

FIG. 2 shows a device according to the invention and a method according to the invention for identifying a damaged bearing of a rotating motor shaft of a motor.

DETAILED DESCRIPTION OF PREFERRED EMBODIMENTS

Figure 1:
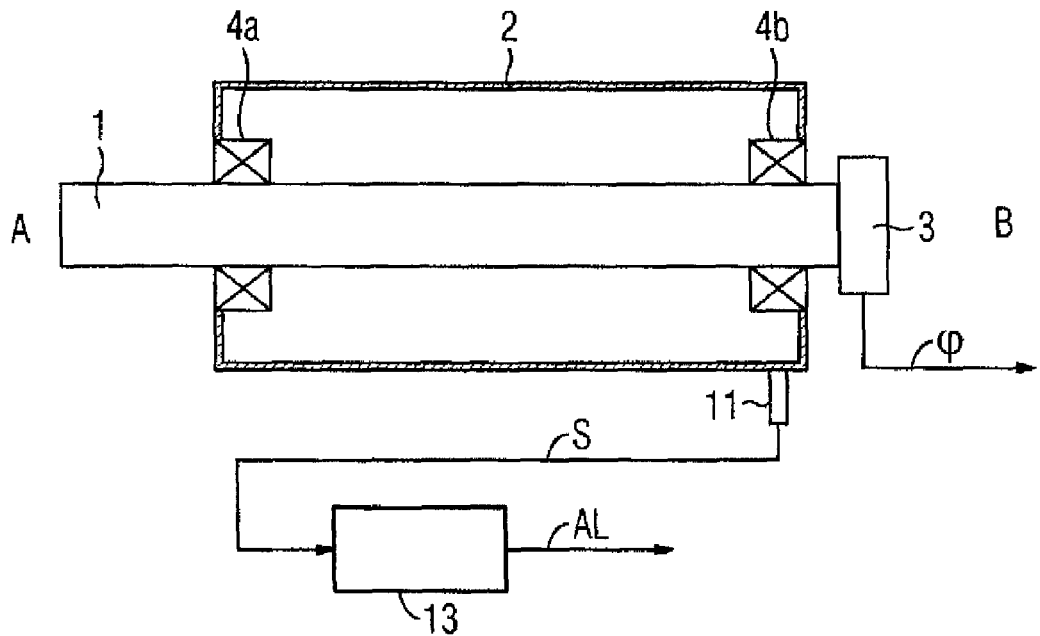
FIG. 1 shows a method and a device for identifying a damaged bearing of a rotating motor shaft of a motor according to the prior art.

FIG. 2 illustrates the method according to the invention and the device according to the invention in the form of an exemplary embodiment. The motor illustrated in FIG. 2 substantially corresponds in terms of its basic design to the motor illustrated previously in FIG. 1. Identical elements in FIG. 2 are therefore provided with the same reference symbols as in FIG. 1. The essential difference with regard to the motor as per FIG. 1 is that the motor as per FIG. 2 does not have a vibration sensor 11 as per FIG. 1. According to the invention, the position signal of the position sensor 3, which position signal indicates the position φ of the motor shaft, is utilized to identify bearing damage of the B-side bearing 4b and/or of the A-side bearing 4a. The motor does of course comprise further elements, but these are not illustrated in FIG. 2 as they are not essential to the understanding of the invention.

The position φ is measured by the position sensor 3 and is supplied as an input variable to a differentiator 12. The differentiator 12 differentiates the position φ with respect to time and carries out a multiplication by a factor ½π, so that a rotational speed n of the motor shaft in the form of a rotational speed is output as an output variable of the differentiator 12. The rotational speed could alternatively also be present, for example, in the form of the rotational angle speed.

The rotational speed n is composed of a constant component $n_{DC}$ of the rotational speed and an alternating component $n_{AC}$ of the rotational speed. Damage in a bearing (for example ball bearing or rolling bearing) of the motor shaft has an effect on the uniformity of the rotation of the motor shaft. The vibrations generated by a damaged bearing are superposed on the constant component $n_{DC}$ of the rotational speed n and generate a permanent alternating component $n_{AC}$ in the rotational speed n.

The rotational speed n is therefore subsequently high-pass filtered by means of a high-pass filter 5, and the alternating component $n_{AC}$ of the rotational speed n is in this way determined as an output variable of the high-pass filter 5.

In order to determine an envelope h of the alternating component $n_{AC}$ of the rotational speed n, the alternating component $n_{AC}$ is rectified by means of a rectifying unit 6. A rectification can be carried out in the rectifying unit 6 for example either by suppressing the negative signal components of the alternating component $n_{AC}$ (half-wave rectification), or rectification can be carried out by calculating the magnitude of the alternating component $n_{AC}$ of the rotational speed. The rectified alternating component $n_{AC}$ of the rotational speed n is subsequently low-pass filtered by means of a low-pass filter 7, and the envelope h is in this way determined as an output variable of the low-pass filter 7.

Figure 3:
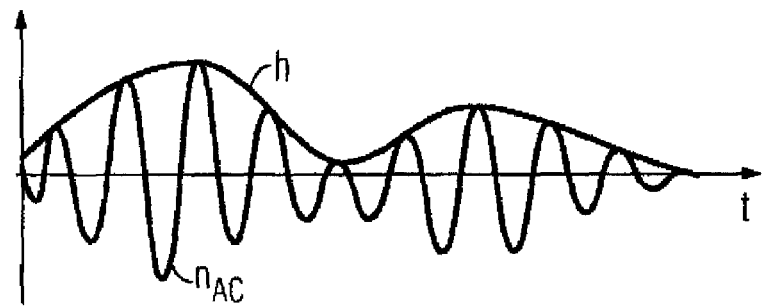
FIG. 3 shows an envelope and FIG. 4 shows an absolute frequency response of the envelope.
Figure 4:
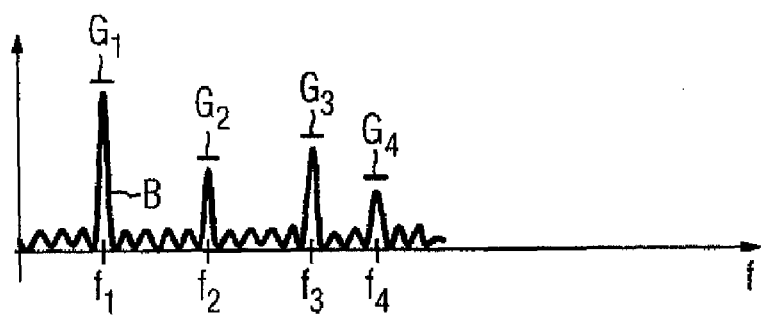

FIG. 3 illustrates, by way of example, the envelope h which is generated by the alternating component $n_{AC}$ of the rotational speed n. The limit frequency of the low pass filter 7 is preferably selected here such that the higher-frequency signal components of the alternating component $n_{AC}$ are suppressed.

The envelope h is supplied as an input variable to a Fourier transformation unit 8. The latter transforms the envelope h by means of Fourier transformation into the frequency domain and determines the absolute frequency response B of the envelope h. The absolute frequency response B is the magnitude of the Fourier transform of the envelope h with respect to the frequency f. The absolute frequency response B of the envelope h is output as an output variable from the Fourier transformation unit 8, and is supplied as an input variable to a limit value detector 9 which, if the absolute frequency response B exceeds a limit value, for example G1, identifies a damaged bearing and generates an alarm signal AL. Here, the alarm signal AL is preferably generated after a relatively long period of exceedance of the limit value in order to avoid false alarms.

FIG. 3 illustrates, by way of example, the typical profile of the absolute frequency response B of the envelope h with respect to the frequency f. At so-called bearing pass frequencies in particular, for example at the bearing pass frequencies $f_1$, $f_2$, $f_3$ and $f_4$, there is a considerable rise in the absolute frequency response in the event of bearing damage. The limit value detector 9 can be designed here so as to monitor only a single limit value or to monitor for the exceedance of a plurality of limit values. For example, it is possible for only the exceedance of the limit value $G_1$ to be monitored, or else the exceedance of the limit values $G_1$, $G_2$, $G_3$ and/or $G_4$. Here, a single bearing has a plurality of bearing pass frequencies, wherein it is in some cases sufficient for a single bearing pass frequency to be monitored in order to identify bearing damage. If the bearing pass frequencies $f_1$, and $f_2$ are the bearing pass frequencies of the bearing 4a, and the bearing pass frequencies $f_3$ and $f_4$ are the bearing pass frequencies of the bearing 4b, and for example all four bearing pass frequencies are monitored for the exceedance of a respectively assigned limit value $G_1$, $G_2$, $G_3$ and/or $G_4$, then both damage in the bearing 4a and damage in the bearing 4b will be identified.

The bearing pass frequencies are specific to each type of bearing and are dependent inter alia on the number of rolling bodies and the bearing geometry. The bearing pass frequencies are generally specified by the manufacturer of the bearing as multiples of the rotational speed. Said bearing pass frequencies can alternatively also be calculated by means of special programs which are for example provided by the manufacturer of the bearing.

If a rotary sensor, which directly outputs a rotational speed as an output variable, is attached to the motor instead of the position sensor 3, then the differentiator 12 can be dispensed with. The output signal of the rotary sensor is then supplied directly as an input variable to the high-pass filter 5.

The bearing pass frequencies $f_1$, $f_2$, $f_3$ and $f_4$ of a bearing can particularly advantageously be stored, for example as multiples of the rotational speed, in a memory 10 (see FIG. 2) on the motor. This ensures that an open-loop and/or closed-loop control device for the open-loop and/or closed-loop control of the motor, which has access to the memory 10, can take the bearing pass frequencies directly from the motor.

It is particularly advantageous if the device according to the invention is embodied as an open-loop and/or closed-loop control device for the open-loop and/or closed-loop control of a motor, since an open-loop and/or closed-loop control device is provided anyway for the open-loop and/or closed-loop control of the motor. An additional external evaluating unit 13 as per FIG. 1 for identifying a damaged bearing as per the prior art can thereby be dispensed with.

It should additionally be explicitly pointed out at this stage that the method according to the invention and the device according to the invention are suitable not only for identifying a damaged bearing of a motor shaft but also very generally for identifying a damaged bearing on other rotating shafts, such as for example on shafts of generators.

What is claimed is:

1. A method for identifying a damaged bearing of a rotating motor shaft of a motor, comprising the steps of:
    determining a rotation speed of the motor shaft,
    determining a temporally varying component of the rotation speed,
    determining an envelope of the temporally varying component of the rotation speed by rectifying the temporally varying component and low-pass filtering the rectified temporally varying component,
    transforming the envelope into the frequency domain and determining an absolute value of a frequency response of the envelope in the frequency domain,
    monitoring the absolute value of the frequency response to detect if the absolute value exceeds a limit value, and
    identifying the bearing as being damaged if the limit value is exceeded.

2. The method as claimed in claim 1, and further comprising the step of monitoring if the limit value is exceeded in a region where a bearing pass frequency is located.

3. The method as claimed in claim 2, wherein the bearing pass frequency is stored in a memory disposed on the motor.

4. The method as claimed in claim 1, and further comprising the steps of determining the mtation speed of the shaft by measuring a position of the shaft with a position sensor and differentiating the measured position with respect to time.

5. A device for identifying a damaged bearing of a rotating motor shaft of a motor, with the device being embodied as an open-loop or a closed-loop controller for respective open-loop or closed-loop control of the motor, the device comprising:
    means for determining a rotation speed of the motor shaft,
    means for determining a temporally varying component of the rotation speed,
    means for determining an envelope of the temporally varying component of the rotation speed by rectifying the temporally varying component and low-pass filtering the rectified temporally varying component,
    means for transforming the envelope into the frequency domain and determining an absolute value of a frequency response of the envelope in the frequency domain, and
    means for monitoring the absolute value of the frequency response to detect if the absolute value exceeds a limit value, and identifying the bearing as being damaged if the limit value is exceeded.

6. A computer program product embodied on a computer-readable medium, said computer program including computer code which, when executed on a computer, enables the computer to perform the method as claimed in claim 1.

7. A device for identifying a damaged bearing of a rotating motor shaft of a motor, with the device being embodied as an open-loop or a closed-loop controller for respective open-loop or closed-loop control of the motor, the device comprising:
    a position sensor for measuring a rotational position of the motor shaft,
    a differentiator for differentiating the measured rotational position with respect to time to determine a rotation speed of the motor shaft,
    a high-pass filter for determining a temporally varying component of the rotation speed,
    a rectifier for rectifying the temporally varying component,
    a low-pass filter for determining from the rectified temporally varying component an envelope of the temporally varying component of the rotation speed,
    a Fourier transformation unit for determining an absolute value of a frequency response of the envelope in the frequency domain, and
    a limit detector for detecting if the absolute value exceeds a predetermined limit value and identifying the bearing as being damaged if the limit value is exceeded.

* * * * *